No. 629,831. Patented Aug. 1, 1899.
W. W. UHLINGER.
GLASS BEAM BRACKET FOR RIBBON LOOMS.
(Application filed Apr. 26, 1899.)
(No Model.) 2 Sheets—Sheet 1.
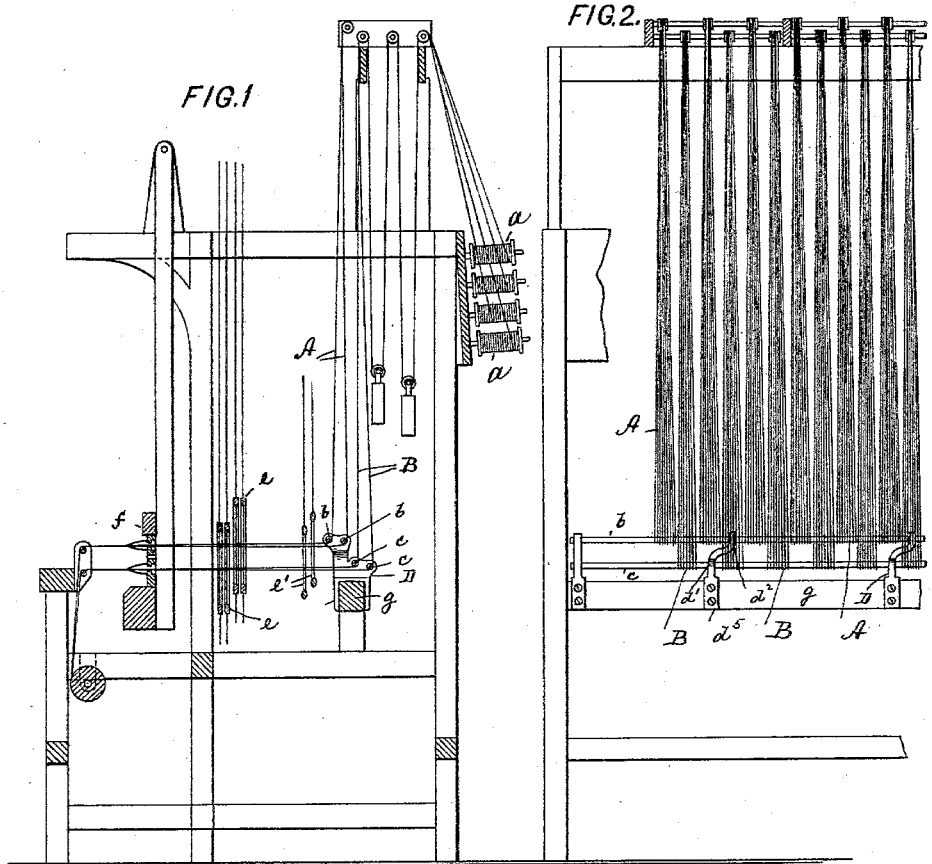
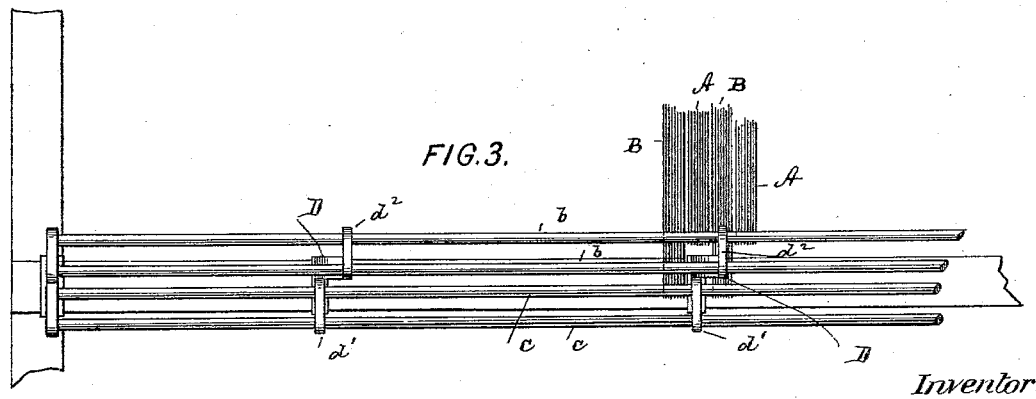
Witnesses:
John Becker.
William Miller.
Inventor:
William W. Uhlinger.
by his attorneys
Roeder & Briesen No. 629,831. Patented Aug. 1, 1899.
W. W. UHLINGER.
GLASS BEAM BRACKET FOR RIBBON LOOMS.
(Application filed Apr. 26, 1899.)
(No Model.) 2 Sheets—Sheet 2.

Witnesses:
John Becker.
William Miller.

Inventor:
William W. Uhlinger
by his attorneys
Roeder & Brienen

UNITED STATES PATENT OFFICE.

WILLIAM W. UHLINGER, OF PATERSON, NEW JERSEY.

GLASS-BEAM BRACKET FOR RIBBON-LOOMS.

SPECIFICATION forming part of Letters Patent No. 629,831, dated August 1, 1899.

Application filed April 26, 1899. Serial No. 714,535. (No model.)

*To all whom it may concern:*

Be it known that I, WILLIAM W. UHLINGER, of Paterson, Passaic county, State of New Jersey, have invented new and useful Improvements in Glass-Beam Brackets for Ribbon-Looms, of which the following is a specification.

This invention relates to the brackets that support the glass bars in ribbon-looms having a double-deck batten. The upper and lower shuttle races or gangs in these battens are out of alinement vertically; and the object of the invention is to so construct the glass-beam brackets that they will not interfere in position with that of the warp-threads. To this effect I so construct the bracket that its upper bearing is vertically out of alinement with its lower bearing, the distance between the bearings corresponding substantially to the distance between one of the upper gang-spaces and the neighboring lower gang-space of the batten. Thus a free disposition and run for the warp-thread is obtained and the gangs can be placed so near together that the output of the loom may be considerably increased.

Figure 4:
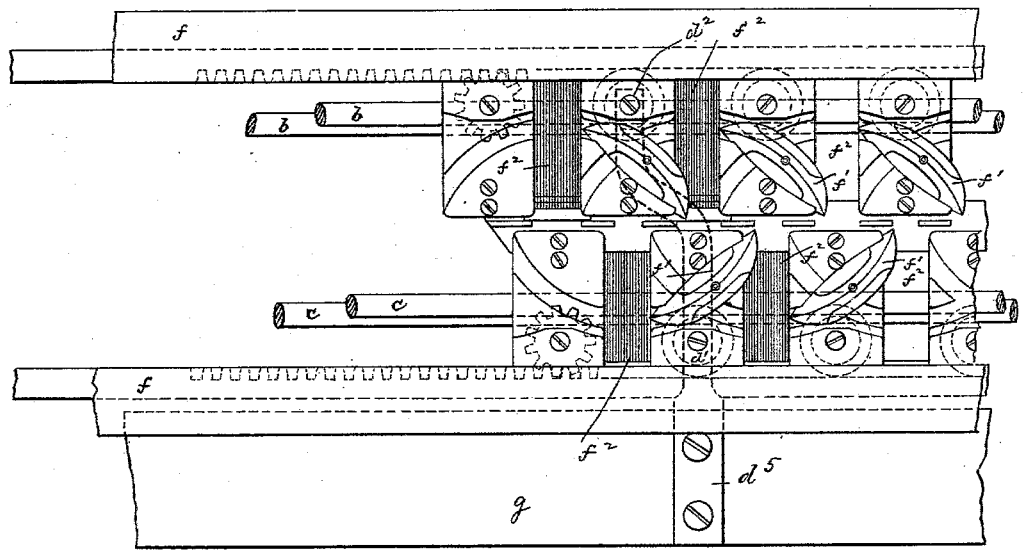
Figure 5:
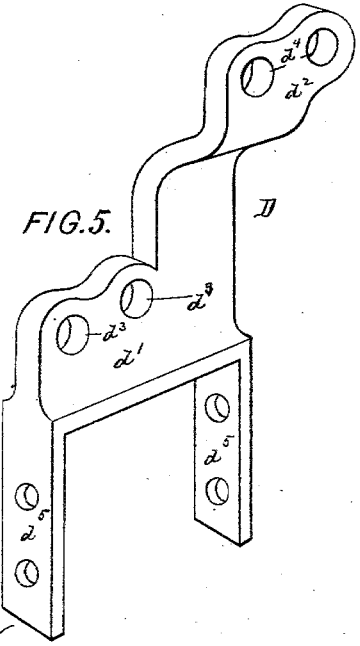

In the accompanying drawings, Figure 1 is a vertical transverse section of part of a ribbon-loom embodying my invention. Fig. 2 is a rear view of part of the loom, illustrating the relative position of the warp-threads; Fig. 3, a plan of the glass bars and brackets; Fig. 4, a front view of part of the double-deck batten and of one of the glass-beam brackets, showing their relative arrangement; and Fig. 5, a perspective view of the bracket.

The letter $a$ represents the warp-spools of a ribbon-loom. $b$ $c$ are the upper and lower glass bars or rods; $e'$, the back reeds; $e$, the harness, and $f$ the double-deck batten. The latter is provided with the two rows of shuttles $f'$, the gangs of each row being separated by the narrow reed-containing spaces $f^2$, arranged to stagger or break line, as shown.

The sets of warp-threads A for each of the upper shuttles pass around the upper glass rod or rods $b$, and sets of warp-threads B for each of the lower shuttles pass around the lower glass rod or rods $c$, the sets on the upper glass bars breaking line with those on the lower glass bars and the unburdened spaces of the rods between the sets of warps breaking line correspondingly. These unburdened spaces I utilize for the purpose of receiving the intermediate brackets D, that support the glass rods, it being well known that the glass bar or bars must be supported at several points along their length, because they must withstand the entire pull of the weighted warps. To adapt the brackets to these spaces, they are made of the peculiar form shown in Fig. 5, in which the upper section or offset $d^2$ is brought vertically out of alinement with the lower section $d'$ by means of a lateral bend in the bracket and is set forward of the lower section, so as to clear the lower warp-threads. The lower section $d'$ is provided with one or more perforations $d^3$ for receiving the lower glass bar or bars $c$. At its forward end the section $d'$ is extended upwardly and laterally to form the upper section $d^2$, having one or more perforations $d^4$ for receiving the upper glass bar or bars $b$. Thus the bearings $d^4$ for the upper bars $b$ are brought vertically out of alinement with the bearings $d^3$ for the lower bars $c$.

A pair of arms $d^5$, depending from the bracket, serve to fasten the same to a suitable supporting-beam $g$ of the loom.

The lateral bend of the bracket should correspond substantially to the distance between neighboring upper and lower spaces $f^2$ on the batten, and the bracket is so placed that its lower section is in vertical plane with one of the lower spaces $f^2$, while its upper section is in vertical plane with the neighboring upper space, Fig. 4. Thus the sets of threads on both of the upper and lower glass bars $b$ and $c$ will clear the brackets without being displaced or crowded, and the gangs can be arranged as close together as convenient, because the warps will always run to them straight and true from the glass bars, and no allowance need be made between the gangs for empty spaces on the bars.

What I claim is—

1. In a ribbon-loom, a bracket provided with a lateral bend and with bearings above and below said bend, combined with upper and lower glass bars supported by said bearings, substantially as specified.

2. In a ribbon-loom, a bracket for supporting glass bars, provided with a lateral bend at its forward end, and with bearings above and below said bend for supporting the glass bars, the upper bearing being vertically out of alinement with the lower bearing, substantially as specified.

WILLIAM W. UHLINGER.

Witnesses:
 JAMES H. COCKER,
 ANTHONY REGELNYER.